United States Patent
Shimada et al.

(10) Patent No.: US 7,723,259 B2
(45) Date of Patent: May 25, 2010

(54) PARTICULATE MATTER (PM) OXIDIZING CATALYST

(75) Inventors: Maki Shimada, Yokohama (JP); Junji Ito, Yokohama (JP); Toshiharu Miyamura, Yokohama (JP); Yasunari Hanaki, Yokohama (JP); Shigeru Chida, Yokosuka (JP); Shinichi Akaishi, Yokosuka (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 11/936,488

(22) Filed: Nov. 7, 2007

(65) Prior Publication Data
US 2008/0318771 A1   Dec. 25, 2008

(30) Foreign Application Priority Data

Nov. 8, 2006 (JP) ............................. 2006-302632
Jul. 9, 2007 (JP) ............................. 2007-179880

(51) Int. Cl.
B01J 23/10 (2006.01)
B01J 23/00 (2006.01)
B01J 23/44 (2006.01)
B01J 21/00 (2006.01)
B01J 8/02 (2006.01)

(52) U.S. Cl. ................ 502/303; 502/251; 502/304; 502/333; 502/339; 502/302; 423/213.5

(58) Field of Classification Search ............. 423/213.5; 502/251, 302, 303, 304, 333, 339; B01J 23/10, B01J 23/40, 23/42

See application file for complete search history.

(56) References Cited

U.S. PATENT DOCUMENTS

| | | | | |
|---|---|---|---|---|
| 5,057,483 A | * | 10/1991 | Wan | 502/304 |
| 5,898,014 A | * | 4/1999 | Wu et al. | 502/302 |
| 5,948,377 A | * | 9/1999 | Sung | 423/213.5 |
| 6,355,220 B1 | | 3/2002 | Blanchard et al. | |
| 7,297,656 B2 | * | 11/2007 | Zhang et al. | 502/339 |
| 7,393,808 B2 | | 7/2008 | Yoshida et al. | |

(Continued)

FOREIGN PATENT DOCUMENTS

EP   1 504 815 A1   2/2005

(Continued)

OTHER PUBLICATIONS

Lin et al. "Sol-gel-derived mesoporous γ-alumina granules" Department of Chemical Engineering, University of Cincinnati Available online Jul. 8, 1999.*

*Primary Examiner*—Roy King
*Assistant Examiner*—Alexander Polyanksy
(74) *Attorney, Agent, or Firm*—Foley & Lardner LLP

(57) ABSTRACT

A particulate matter oxidizing catalyst includes: at least one metal selected from the group consisting of: gallium, manganese, iron, cobalt, nickel, copper, yttrium, zirconium, niobium, molybdenum, silver, lanthanum, praseodymium, neodymium and gold; and cerium, wherein a first oxide includes: the cerium, and a first metal which is at least one element selected from the group consisting of: gallium, manganese, iron, cobalt and nickel, wherein a second oxide includes: the cerium, and a second metal which is at least one element selected from the group consisting of: praseodymium, zirconium and aluminum, and wherein the second oxide and the first oxide have a content ratio of second oxide/(first oxide+second oxide)=0.1 by mass to 0.8 by mass.

8 Claims, 15 Drawing Sheets

X-RAY DIFFRACTION PATTERN OF $Ce_{70}Pr_{30}$

U.S. PATENT DOCUMENTS

| | | | |
|---|---|---|---|
| 7,399,728 B2 * | 7/2008 | LaBarge | 502/325 |
| 2004/0018939 A1 * | 1/2004 | Chigapov et al. | 502/303 |
| 2004/0259731 A1 * | 12/2004 | Yan | 502/439 |
| 2005/0020443 A1 * | 1/2005 | Wei et al. | 502/325 |
| 2005/0282698 A1 * | 12/2005 | Southward et al. | 502/34 |
| 2007/0264486 A1 * | 11/2007 | Verdier | 428/315.5 |

FOREIGN PATENT DOCUMENTS

| | | |
|---|---|---|
| JP | 2000-507877 A | 6/2000 |
| JP | 2003-334443 A | 11/2003 |
| JP | 3528839 B2 | 3/2004 |
| JP | 3657620 B2 | 3/2005 |

* cited by examiner

RESULT OF PARTICULATE COMBUSTION TEST AT 400°C

RESULT OF PARTICULATE COMBUSTION TEST AT 450°C

PARTICULATE MATTER (PM) OXIDIZING CATALYST

BACKGROUND OF THE INVENTION

1. Field of the Invention

The present invention relates to a particulate matter (PM) oxidizing catalyst. More in detail, the present invention relates to a PM oxidizing catalyst capable of continuously oxidizing or combusting PM from a relatively low temperature during an engine operation.

2. Description of the Related Art

Conventionally known method for a diesel engine includes the following operations. An electric power and the like is inputted to a collected particulate matter (PM) or fuel is consumed to thereby increase temperature of the collected particle, then, oxidation or combustion reproduces a particulate filter. However, the reproduction by the electric power and the like requires a great energy quantity, while the reproduction by the fuel decreases fuel economy (i.e., increasing fuel consumption) of the engine.

With the above background, a catalyst capable of oxidizing PM at a relatively low temperature to thereby decrease the consumed electric power and improve fuel economy is used, and the material and component of such catalyst are improved.

U.S. Pat. No. 6,355,220 (family of laid-open JP2000507877T and examined JP3657620) proposes use of $Ce_x$—$Zr_y$—$Pr_x$ (x=0 mol % to 0.3 mol %) as 3-way catalyst.

Moreover, EP1504815 (family of laid-open JP2003334443=examined JP3528839) proposes use of Ce—Zr-M (M=La, Sm, Nd, Gd, Sc, Y).

However, for oxidizing the PM from a relatively low temperature, the above conventional methods each have a room for improvement.

SUMMARY OF THE INVENTION

It is an object of the present invention to provide a particulate matter (PM) oxidizing catalyst capable of oxidizing or combusting PM from a relatively low temperature.

According to a first aspect of the present invention, a particulate matter oxidizing catalyst comprises: at least one metal selected from the group consisting of: gallium, manganese, iron, cobalt, nickel, copper, yttrium, zirconium, niobium, molybdenum, silver, lanthanum, praseodymium, neodymium and gold; and cerium, wherein a first oxide includes: the cerium, and a first metal which is at least one element selected from the group consisting of: gallium, manganese, iron, cobalt and nickel, wherein a second oxide includes: the cerium, and a second metal which is at least one element selected from the group consisting of: praseodymium, zirconium and aluminum, and wherein the second oxide and the first oxide have a content ratio of second oxide/(first oxide+second oxide)=0.1 by mass to 0.8 by mass.

Other objects and features of the present invention will become understood from the following description with reference to the accompanying drawings.

DESCRIPTION OF THE PREFERRED EMBODIMENTS

PM Oxidizing Catalyst

Figure 1:
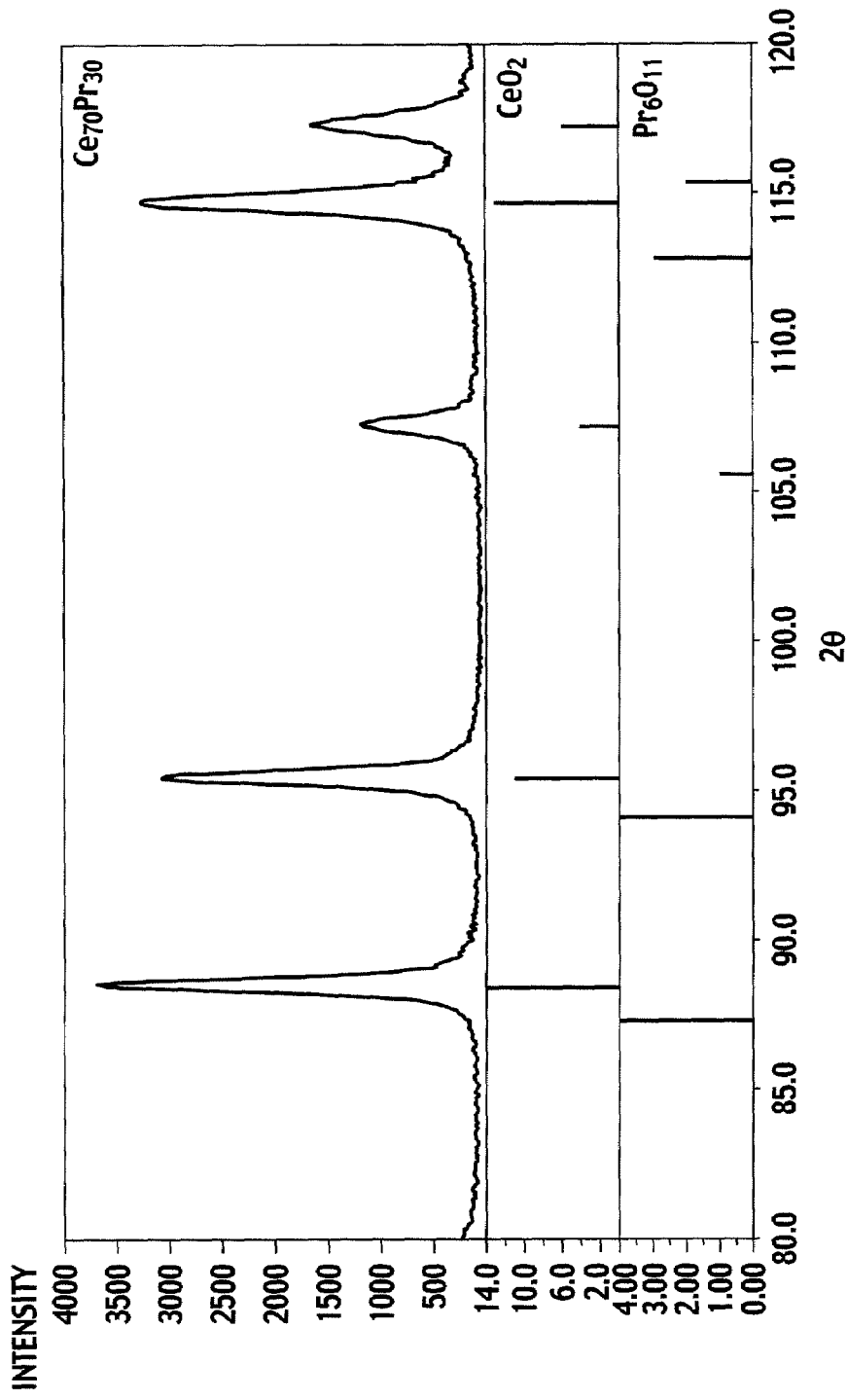
FIG. 1 shows an XRD (X-ray diffraction) data of CePr compound oxide.

A PM oxidizing catalyst of the present invention is to be set forth in detail.

In this specification, "%" for concentration, blending quantity, loading quantity and the like denotes mass percentage unless otherwise specified.

The PM oxidizing catalyst of the present invention has an oxygen releasing catalyst Typically, the PM oxidizing catalyst includes i) a particulate filter, and ii) an oxide presenting a lattice oxygen desorption energy $\Delta E$ of less than or equal to 60 kcal/mol and carried on the particulate filter.

This PM oxidizing catalyst can oxidize PM from a relatively low temperature, typically at 400° C., and promote the PM oxidization more preferably under an excessive oxygen condition such as a lean atmosphere (for example, A/F [air to fuel ratio] of more than or equal to 15).

As such, the PM oxidizing catalyst of the present invention can continuously oxidize the PM, typically, during an operation of a diesel engine. Unlike the conventional technology, the PM oxidizing catalyst of the present invention does not need a special temperature control (heat sequence) for the PM oxidization, that is, particulate filter reproduction. Therefore, it is not essential to input an electric power energy, and it is not necessary to consume fuel for a special heat sequence.

Herein, the particulate filter to be used is not specifically limited, examples thereof including fabric filter, alternate weather strip filter and what is called a checkered honeycomb carrier.

In the oxide, examples of a first metal (M1) other than cerium (Ce) include gallium (Ga) and the like, transition elements including scandium (Sc) to mercury (Hg) in a strict sense, lanthanoid including lanthanum (La) to lutetium (Lu), rare earth elements including actinoid such as actinium (Ac) to lawrencium (Lr), and the like. Especially, gallium (Ga), manganese (Mn), iron (Fe), cobalt (Co), nickel (Ni), copper (Cu), yttrium (Y), zirconium (Zr), niobium (Nb), molybdenum (Mo), silver (Ag), lanthanum (La), praseodymium (Pr), neodymium (Nd) and gold (Au) are preferable. The above first metal (M1) can be used alone or in combination of two or more.

Preferably, mol ratio of Ce/(Ce+Ga) is 0.01% to 50%.

[First Embodiment Directed to PM Oxidizing Catalyst]

According to a first embodiment directed to the PM oxidizing catalyst under the present invention, a special oxide included in the oxygen releasing catalyst is a second oxide Ox2 that includes Ce and Pr.

In this case, Ce and Pr have mol ratio (Ce:Pr) of 4:1 to 1:4, preferably 4:1 to 2:3.

The mol ratio (Ce:Pr) out of 4:1 to 1:4, as the case may be, fails to bring about a significant advantage (of the PM oxidization capability) over $CeO_2$ alone or $Pr_6O_{11}$ alone.

[Second Embodiment Directed to PM Oxidizing Catalyst]

Meanwhile, according to a second embodiment directed to the PM oxidizing catalyst under the present invention, the above special oxide is a first oxide (Ox1) including:

the first metal (M1) such as gallium (Ga), manganese (Mn), iron (Fe), cobalt (Co) and nickel (Ni) or an arbitrary combination thereof, and cerium (Ce).

Herein, among the first metals (M1), at least one of Mn and Ga is preferable. Ce—Mn compound oxide or Ce—Ga—Mn compound oxide causes the PM oxidization at about 400° C.

Moreover, the PM oxidizing catalyst according to the second embodiment preferably includes the second oxide (Ox2) including:

a second metal (M2) such as praseodymium (Pr), zirconium (Zr) and aluminum (Al) or an arbitrary combination thereof, and cerium (Ce).

Among the second oxides Ox2, Ce—Pr oxide capable of continuously causing the PM oxidization from about 450° C. is especially preferable.

In addition, with the PM fuel catalyst according to the second embodiment, combining the Ce—Pr oxide Ox2 with the Ce—Mn compound oxide Ox1 or Ce—Ga—Mn compound oxide Ox1, makes the following operations:

1) Ce—Mn compound oxide Ox1 or Ce—Ga—Mn compound oxide Ox1 ignites the PM from a low temperature of about 400° C., and 2) the Ce—Pr oxide Ox2 continuously oxidizes the PM from about 450° C.

As such, the PM oxidizing catalyst of the present invention made by combining the first oxide Ox1 with the second oxide Ox2 can accomplish a proper PM oxidization due to the above respective operations.

Herein, with the PM oxidizing catalyst of the present invention, content ratio between the second oxide Ox2 and the first oxide Ox1 is preferably Ox2/(Ox1+Ox2)=0.1 to 0.8 by mass, more preferably 0.25 to 0.75 by mass.

The above content ratios allow the first oxide Ox1 and the second oxide Ox2 to work significantly, thus causing the fuel efficiently and continuously.

Moreover, the first oxide Ox1 and second oxide Ox2 are preferably carried on the particulate filter in such a configuration that a first layer including the Ce—Mn compound oxide Ox1 and a second layer including the Ce—Pr oxide Ox2 are formed separately.

Especially, the following structures are preferable:

1) forming the first layer (for the Ce—Mn compound oxide Ox1) upstream relative to an exhaust gas flow, and the second layer (for the Ce—Pr oxide Ox2) downstream relative to the exhaust gas flow, and 2) forming the second layer (for the Ce—Pr oxide Ox2) lower and the first layer (for the Ce—Mn compound oxide Ox1) upper.

Besides, the PM oxidizing catalyst of the present invention preferably includes a noble metal such as platinum (Pt), palladium (Pd), rhodium (Rh) and iridium (Ir) or an arbitrary combination thereof, especially Pt is preferable.

Adding the above noble metal(s) improves the PM oxidization effect.

EXAMPLES

Hereinafter, the present invention is to be set forth more in detail based on the following comparative examples and examples. The present invention is, however, not limited to the above.

Example 1

CePr compound oxide $\{CeO_2:Pr_6O_{11}=70:30$ (mol ratio)$\}$ made by Anan Kasei Co., Ltd (hereinafter referred to as "Anan Kasei") was used.

Herein, an X-ray photoelectron spectroscopy (hereinafter referred to as "XPS") is used for measuring a bonding energy and identifying valence number. When different elements are present, obtaining change of respective bonding energies can measure electron awarding-accepting between atoms. The above electron awarding-accepting brings about an interaction between the atoms via electrons, thus ordinarily determining that a bond is present between the atoms.

The XPS analysis of the above CePr oxide has found out the following:

1) of trivalence and quadrivalence which are ordinarily observed in $CeO_2$, Ce—Pr oxide showed decrease in Ce trivalence, and 2) of trivalence and quadrivalence which are ordinarily observed in $Pr_6O_{11}$, Ce—Pr oxide showed presence of Pr trivalence only.

This shows that the stability is brought about to a low oxidation state among the oxidation states of Pr and to a high oxidation state among the oxidation states of Ce, showing the electron flowing from Ce to Pr. With this, a bond is present via O (oxygen atom) between Ce and Pr which are present at least on a surface of the CePr oxide.

Moreover, the CePr oxide was subjected to an X-ray diffraction analysis, coming up with an X-ray diffraction data, as shown in FIG. 1. As shown in FIG. 1, peaks of the oxide ($Ce_{70}Pr_{30}$) are present in a position same as those of $CeO_2$, showing no peak shift.

As such, from the results of the X-ray diffraction analysis and XPS analysis, in this CePr oxide, Ce and Pr are made compound in a state that crystal structure (fluorite structure) of $CeO_2$ is held, thus forming CePr compound oxide.

[PM Oxidization Test]

The CePr compound oxide described above and a particulate matter PM were mixed at a weight ratio of 1:1 for 20 min by an agate mortar. Then, the thus obtained mixture was sampled by 0.02 g, which was then set in a glass reaction tube of a quadrupole mass analyzer (Q-MASS device). He gas was allowed to flow in the glass reaction tube at 100 cc/min, and then temperature was increased to an monitoring temperature (for example, 400° C., 425° C., 450° C. or 500° C.). The mixture was kept at rest at the arbitrary temperature for 10 min. After the mixture was stabilized, $O_2$ 10 vol % of balance gas was added at 100 cc/min, $CO_2$ ion intensity {M/Z=44 (mass number)} was monitored, thereby measuring oxidization behavior.

Figure 2:
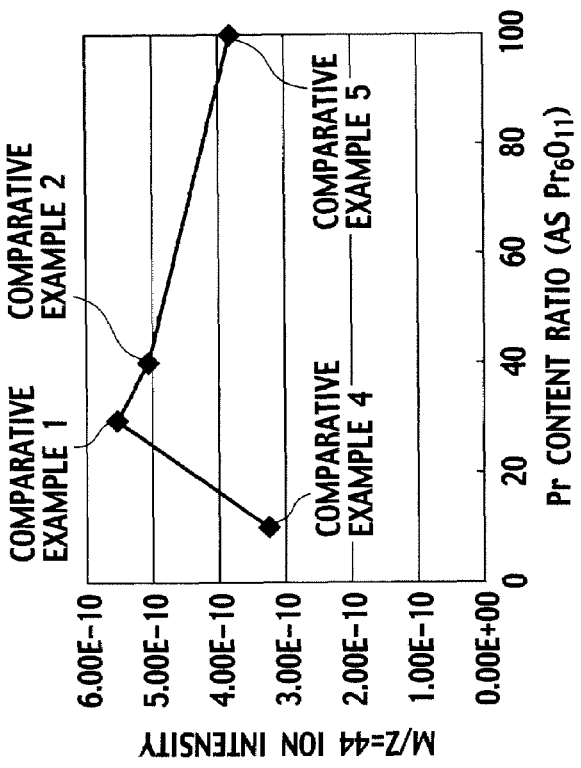
FIG. 2 is a graph showing a result of PM (particulate matter) oxidization test by a quadrupole mass analyzer (Q-MASS device).
Figure 2:
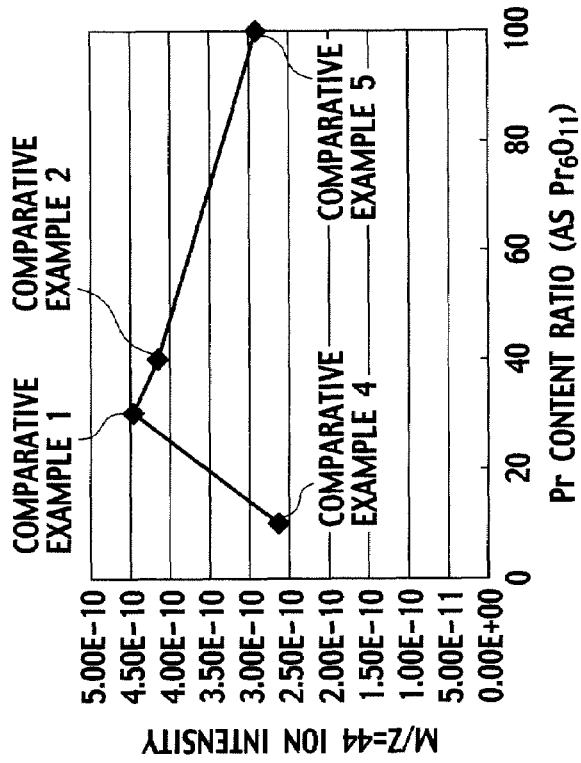

FIG. 2 and table 1 show measurement results at a gas temperature 500° C. after 500 sec and 100 sec.

[Calculation of Lattice Oxygen Desorption Energy (ΔE)]

The lattice oxygen desorption energy (ΔE) of CePr compound oxide according to the example 1 was calculated under the following condition, and the thus obtained results are also shown in table 1.

Example 2

Operations like those according to the example 1 were repeated other than that CePr compound oxide {$CeO_2$: $Pr_6O_{11}$=60:40 (mol ratio)} made by Anan Kasei was used. Results are shown in FIG. 2 and table 1.

Example 4

Operations like those according to the example 1 were repeated other than that CePr compound oxide {$CeO_2$: $Pr_6O_{11}$=90:10 (mol ratio)} made by Anan Kasei was used. Results are shown in FIG. 2 and table 1.

Comparative Example 1

Operations like those according to the example 1 were repeated other than that $Pr_6O_{11}$ made by Anan Kasei was used in place of CePr compound oxide. Results are shown in FIG. 2 and table 1.

TABLE 1

|  |  |  |  | Result of oxidizing PM at 500° C. | | | |
| --- | --- | --- | --- | --- | --- | --- | --- |
|  | Composition | Quantity of PM oxidizing catalyst | Quantity of PM | after 500 sec $CO_2$ ion intensity (M/Z = 44) | after 100 sec $CO_2$ ion intensity (M/Z = 44) | Result of oxidizing PM at 450° C. after 100 sec | ΔE kcal/mol |
| Example 1 | Ce 70 mol %-Pr 30 mol % | 0.01 g | 0.01 g | 4.46E−10 | 5.54E−10 | 4.47E−10 | 52.1 |
| Example 2 | Ce 60 mol %-Pr 40 mol % | 0.01 g | 0.01 g | 4.15E−10 | 5.08E−10 | 4.15E−10 | 52.1 |
| Example 3 | Ce 70 mol %-Mn 30 mol % | 0.01 g | 0.01 g | 3.15E−10 | 1.23E−09 | 1.22E−10 | −7.3 |
| Example 4 | Ce 90 mol %-Pr 10 mol % | 0.01 g | 0.01 g | 2.62E−10 | 3.23E−10 | 2.46E−10 | — |
| Comparative example 1 | $Pr_6O_{11}$ | 0.01 g | 0.01 g | 2.92E−10 | 3.85E−10 | 2.66E−10 | — |

Pre/post: Materials studio 3.2 (made by Accelrys)

Solver: DMol3 (made by Accelrys)

temperature: Absolute 0

Approximation: Generalized gradient approximation (GGA)

Figure 3:
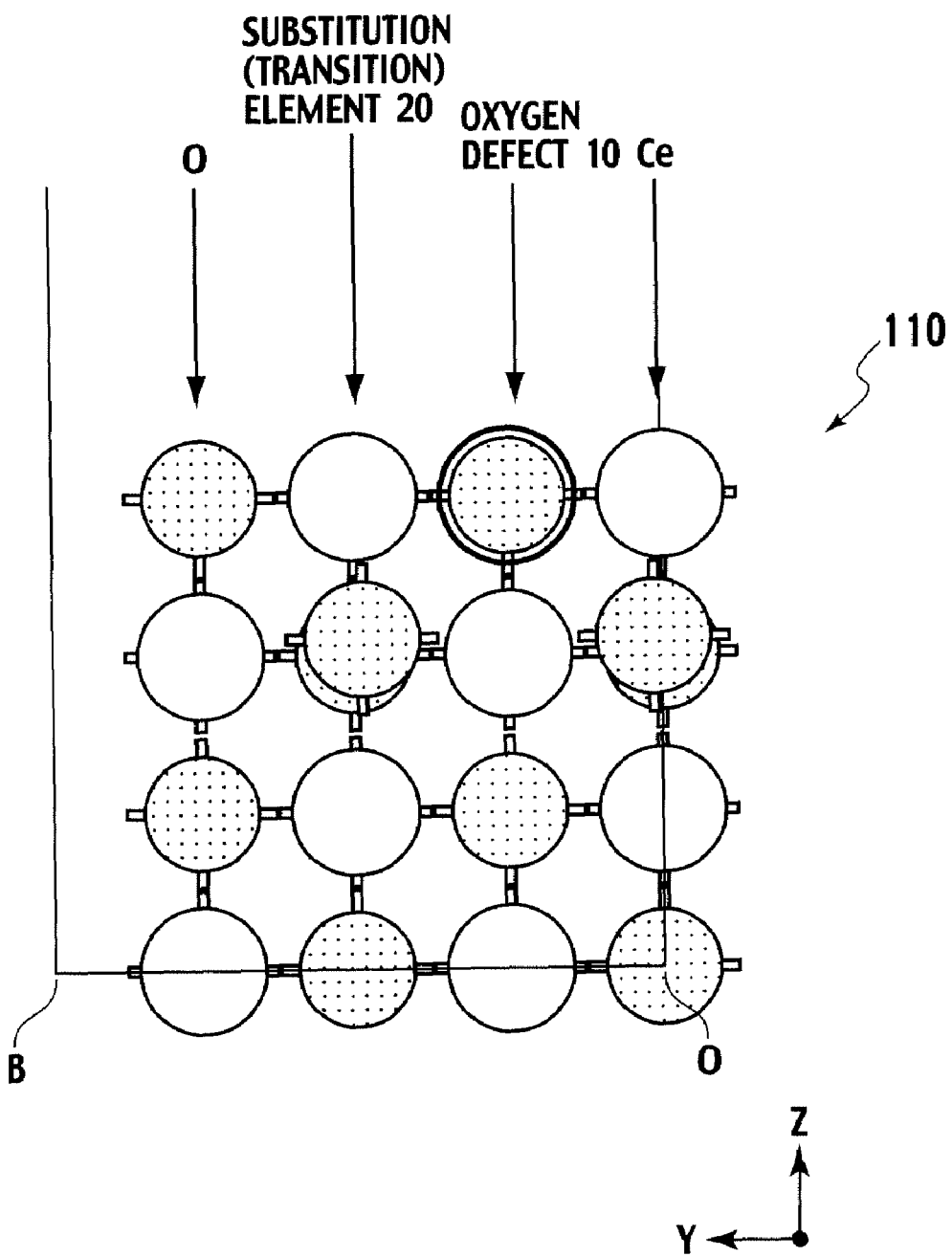
FIG. 3 is a schematic showing an example of a model used for calculating a lattice oxygen desorption energy $\Delta E$ by the density functional theory.

FIG. 3 is a schematic showing an example of a model used for calculating the lattice oxygen desorption energy ΔE by the density functional theory. FIG. 3 shows a compound oxide CeXOxide obtained by adding an additive element X to $CeO_2$, where a face (110) supposed to have an affluent reactivity as $CeO_2$ is so cut as to serves as a surface. Herein, FIG. 3 per se is the face (110).

The following first energy (E1), second energy (E2) and third energy (E3) were calculated:

1) a first energy (E1) obtained by substituting a Ce atom (present on a surface of $CeO_2$) with a transition element 20 and making an O atom (positioned adjacent to the transition element 20) defective 10, 2) a second energy (E2) obtained by substituting the Ce atom (present on the $CeO_2$ surface) with the transition element 20 and making the O atom (positioned adjacent to the transition element 20) not defective 10, and 3) a third energy (E3) of $O_2$ molecule.

Then, the lattice oxygen desorption energy (ΔE) was calculated by the following expression (1).

$$\Delta E = E1 + (E3/2) - E2 \quad (1)$$

Ordinarily, a mass analyzer makes the following operations in advance: flowing $CO_2$ having a previously known concentration, measuring an ion intensity, and preparing a working curve. The larger the ion intensity is the more the emission quantity of $CO_2$ is, and in this case the working curve determines that the oxidization efficiency of PM is good.

Comparative Example 1

Preparing CeMnOx 71.5 g of $Mn(NO_3)_2 \cdot 6H_2O$ and 207 g of $Ce(NO_3)_2 \cdot 6H_2O$ were taken (scaled) and dissolved in 1150 g of ion exchange water, followed by stirring. After the continuous stirring of 1 hour, 25% of ammonia water was calmly and slowly dropped in the thus obtained which is still stirred, such that PH≧7. Then, the thus generated hydroxide was filtered with a centrifugal separator, and a gel of the hydroxide was left at rest for one night-and-daytime. Moreover, the thus obtained was dried at 150° C. for 5 hrs, then was fired in a muffle race at 700° C. for 5 hrs, to thereby obtain CeMnOx powder.

Herein, this CeMnOx powder was so prepared as to include 70 mol % of $CeO_2$ and 30 mol % of $MnO_2$ in storing quantity. The above CeMnOx powder is denoted as $Ce_{0.7}Mn_{0.3}Ox$. Moreover, a part of the CeMnOx powder was fired at 800° C. for 4 hrs, to be used for the subsequent operations.

Figure 4:
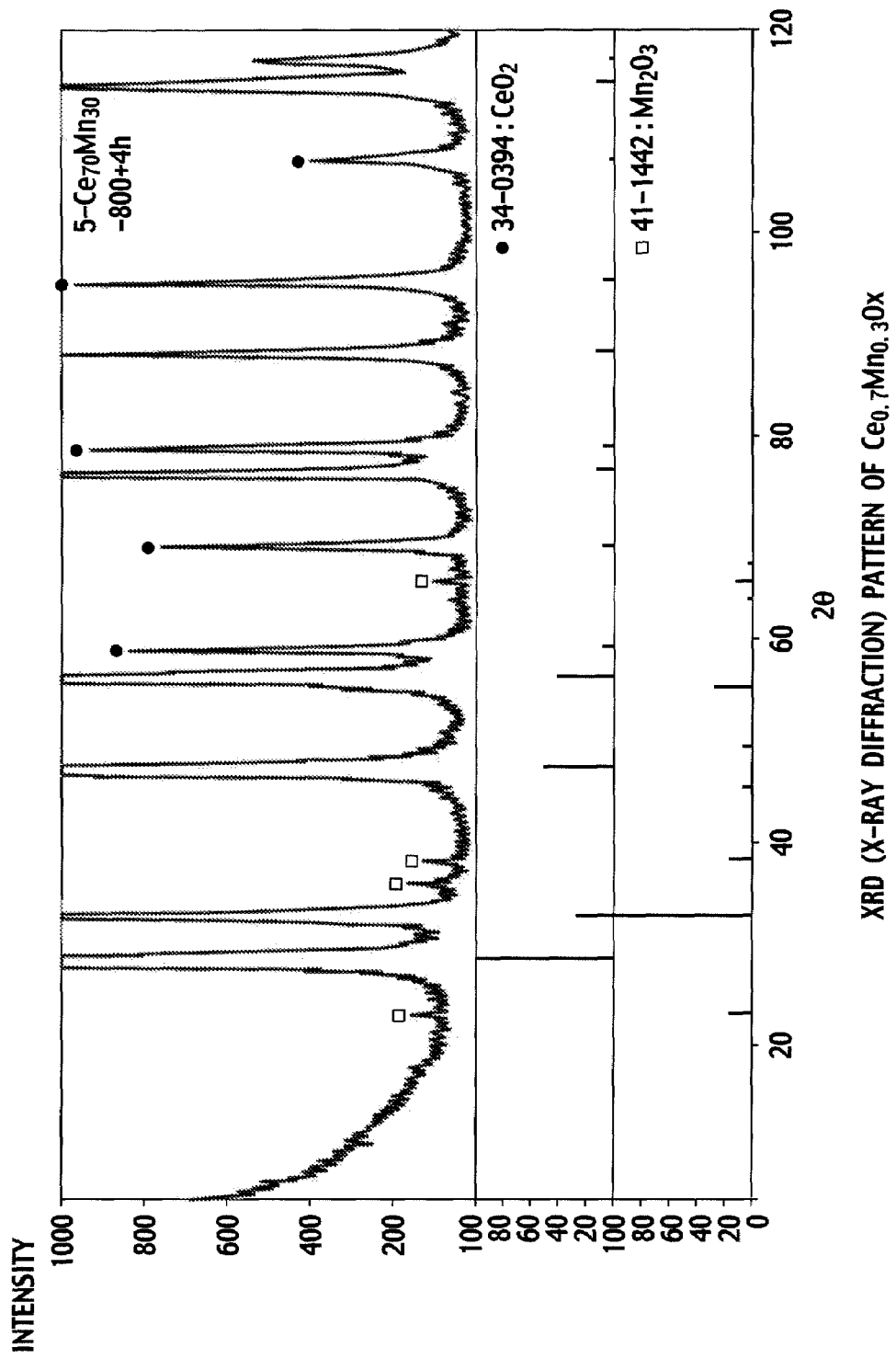
FIG. 4 is a chart showing XRD pattern of $Ce_{0.7}Mn_{0.3}Ox$ powder.
Figure 5:
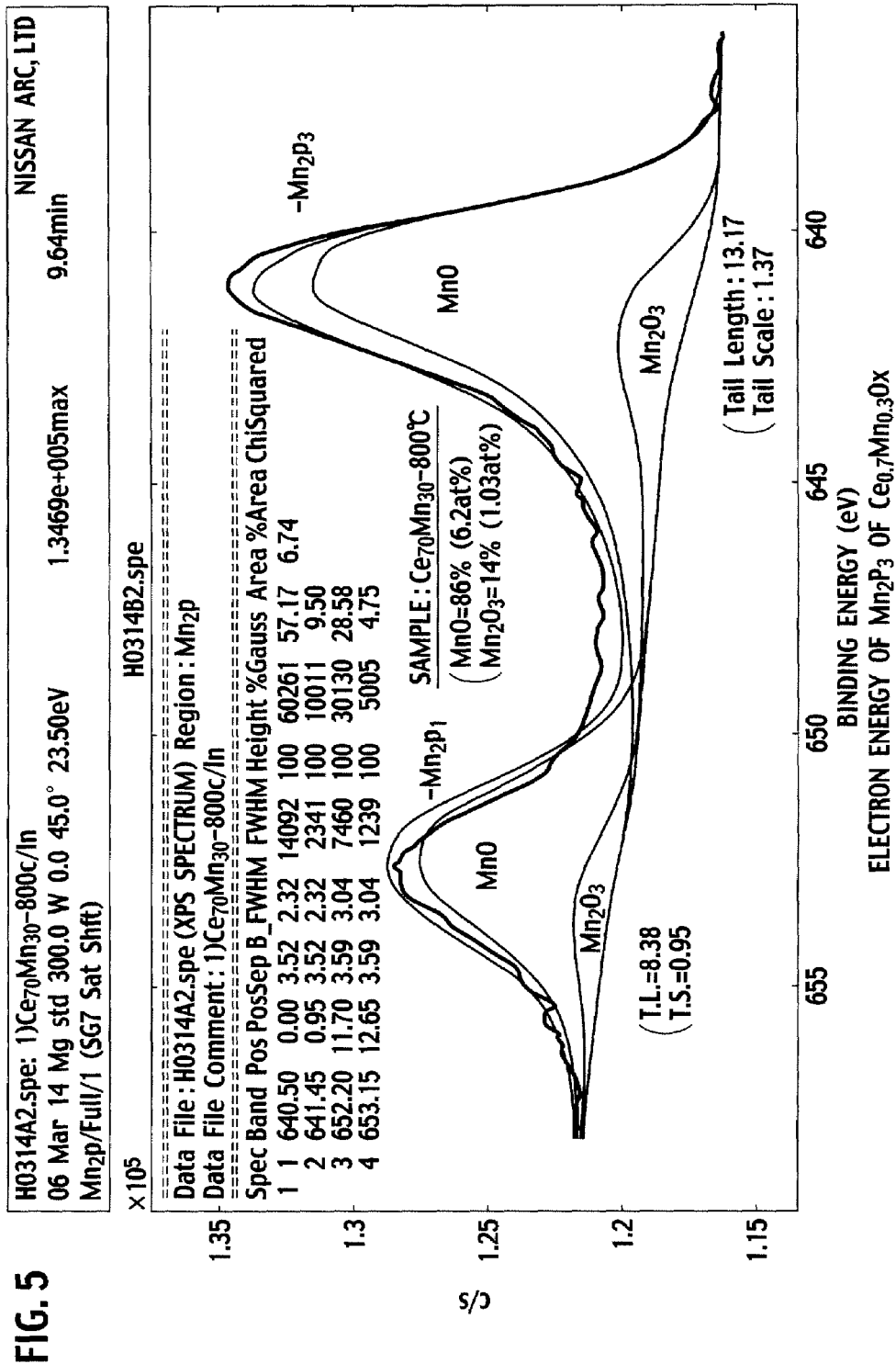
FIG. 5 is a graph showing a result of state analysis through an X-ray photoelectron spectroscopy (XPS) of $Ce_{0.7}M_{0.7}Ox$ powder.

An X-ray diffraction (XRD) pattern of the CeMnOx powder is shown in FIG. 4. $CeO_2$ and $Mn_2O_3$ were detected Moreover, a state analysis result of the CeMnOx powder through an X-ray photoelectron spectroscopy (XPS) is shown in FIG. 5.

Figure 6:
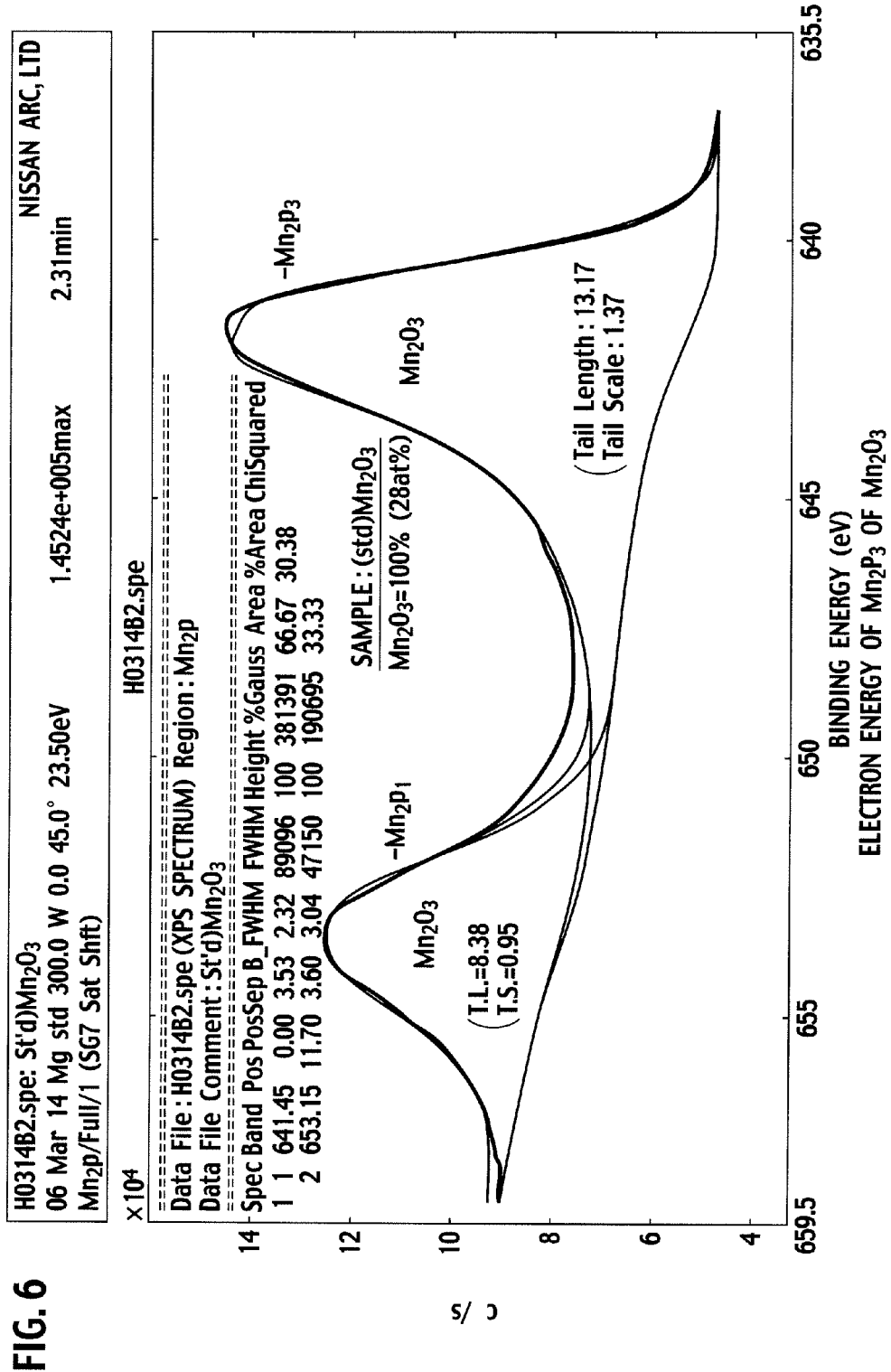
FIG. 6 is a graph showing a result of state analysis through an X-ray photoelectron spectroscopy (XPS) of $Mn_2O_3$.

Besides, for reference purpose, a state analysis result of $Mn_2O_3$ through the XPS is shown in FIG. 6.

As shown in FIG. 4, the XRD detected the states of $CeO_2$ and $Mn_2O_3$. However, FIG. 6 shows that Mn is present mainly as MnO state ($Mn^{2+}$) on a surface necessary for the reaction.

That is, the XPS result shows that Ce and Mn are bonded on the surface of the oxide, while the XRD determines that $CeO_2$ and $Mn_2O_3$ are present separately and are not made compound.

As such, the oxide of this example has a compound surface, while not having a compound inner part

[Preparation of Sample]

A particulate matter PM, and a powder which was made by firing $Ce_{0.7}Mn_{0.3}Ox$ at 800° C. were measured at weight ratio of 1:1, then mixed in an agate mortar for 20 min, to thereby obtain a sample.

[PM oxidization Test]

Figure 7:
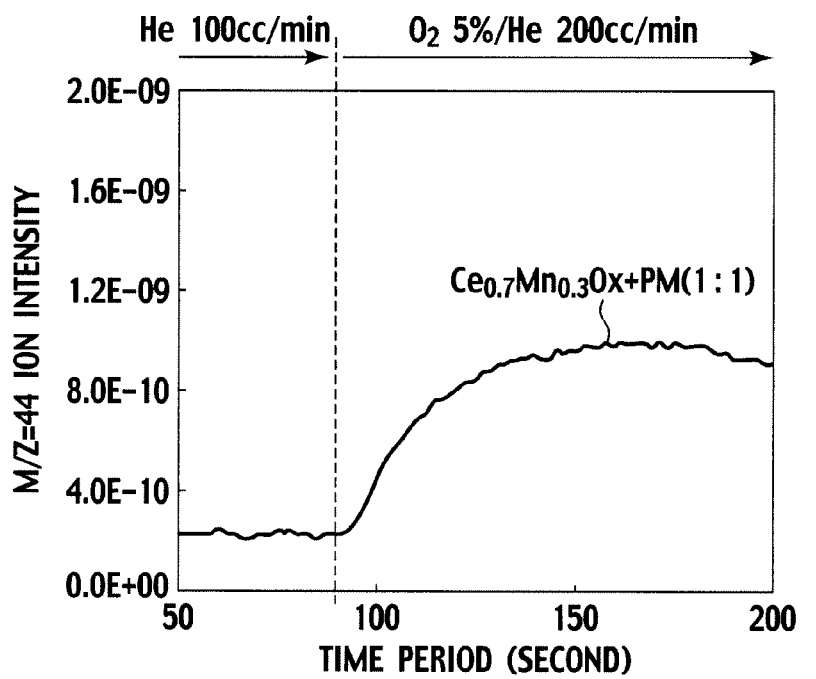
FIG. 7 is a graph showing a result of PM oxidization test by Q-MASS at 400° C.
Figure 8:
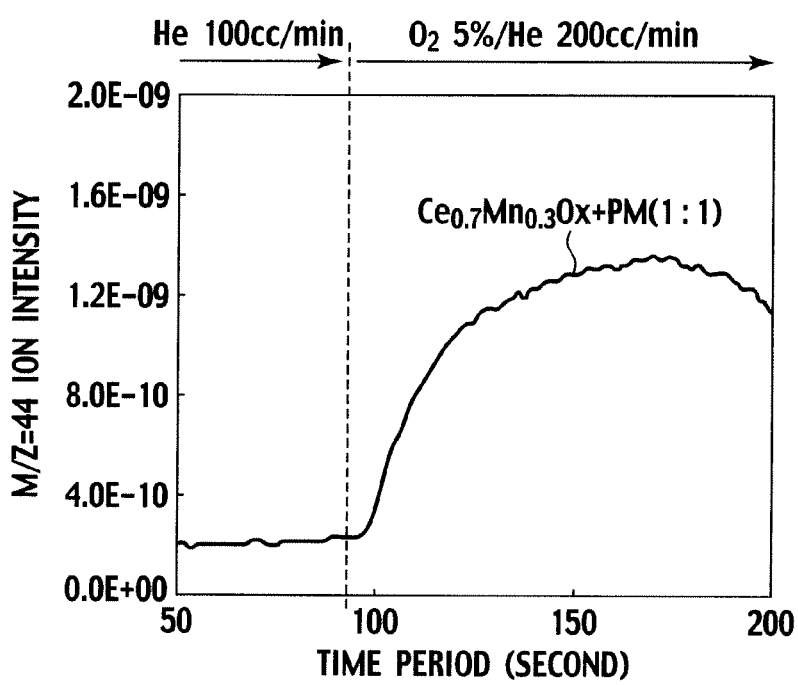
FIG. 8 is a graph showing a result of PM oxidization test by Q-MASS at 450° C.

The thus obtained sample was subjected to a PM oxidization test like that of the Example 1. However, the temperature was set to 400° C. and 450° C. and mass numbers 32 and 44 were monitored. The thus obtained results are shown in FIG. 7 and FIG. 8. Herein, FIG. 7 is directed to 400° C., while FIG. 8 is directed to 450° C.

In FIG. 7 and FIG. 8, the abscissa denotes time period (sec), while the ordinate denotes ion intensity of mass analyzer. According to this example, the PM oxidization test was started after an elapse of 90 sec since data had been obtained 90 sec before the oxygen introduction.

In addition to the PM oxidization test results of this example, table 1 also shows the calculated lattice oxygen desorption energy ΔE value.

FIG. 7, FIG. 8 and table 1 show that $Ce_{0.7}Mn_{0.3}Ox$ is excellent in PM oxidization capability from 400° C.

Example 5

Preparation of $Ce_{0.7}Mn_{0.3}Ox$+PM

Operations like those according to the example 3 were repeated, to thereby prepare samples.

[Preparation of $Ce_{0.7}Pr_{0.3}Ox$]

$Ce_{0.7}Pr_{0.3}Ox$ made by Anan Kasei was fired at 800° C. for 4 hrs in a muffle furnace.

Figure 9:
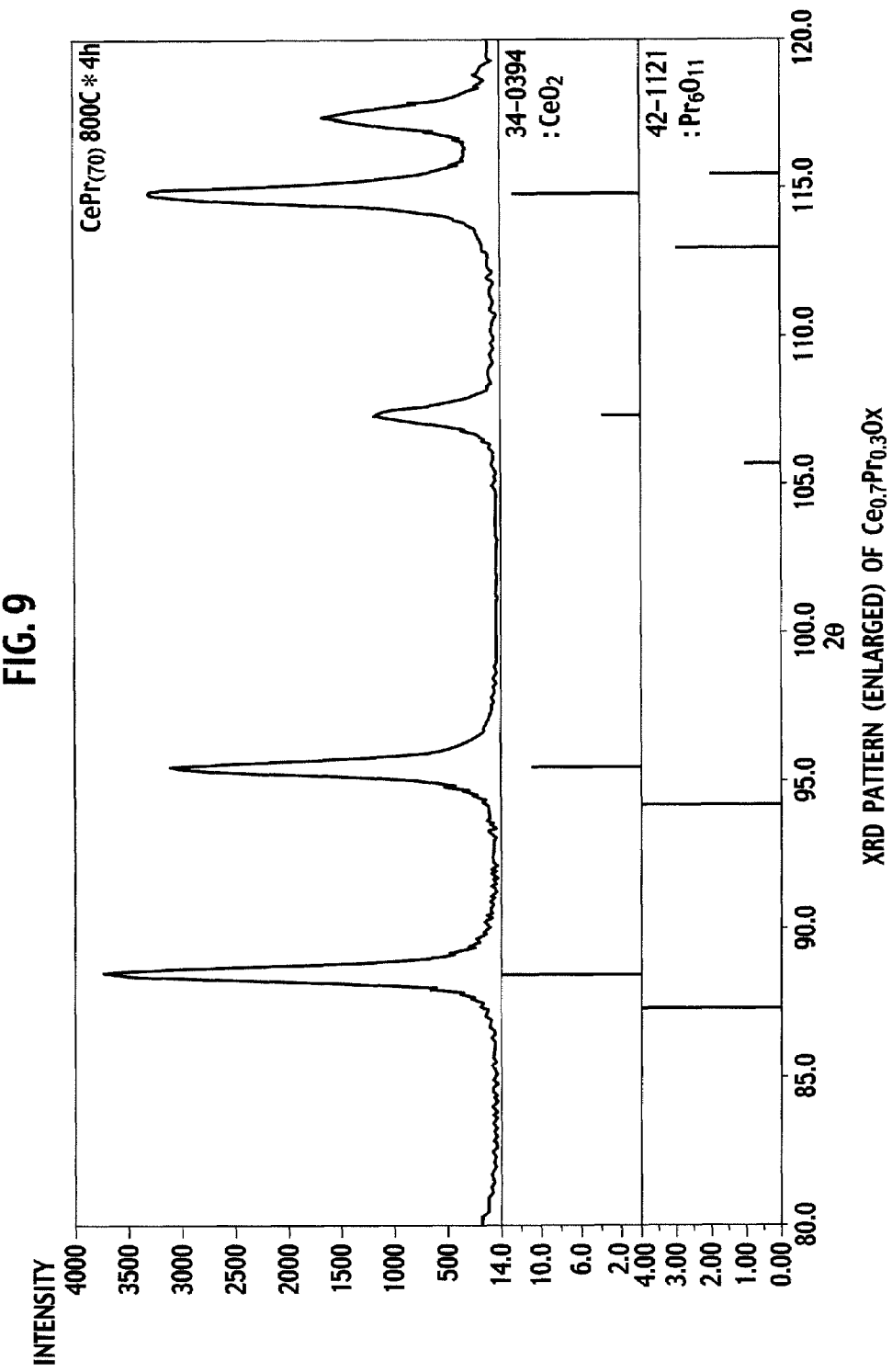
FIG. 9 is a chart showing XRD pattern of $Ce_{0.7}Pr_{0.3}Ox$ powder.

An XRD pattern of the thus fired powder is shown in FIG. 9. No collection attributable to Pr is shown and $CeO_2$ alone was detected.

Moreover, a state analysis result of the thus fired powder through an X-ray photoelectron spectroscopy (XPS) is shown in FIG. 10 to FIG. 13.

Figure 10:
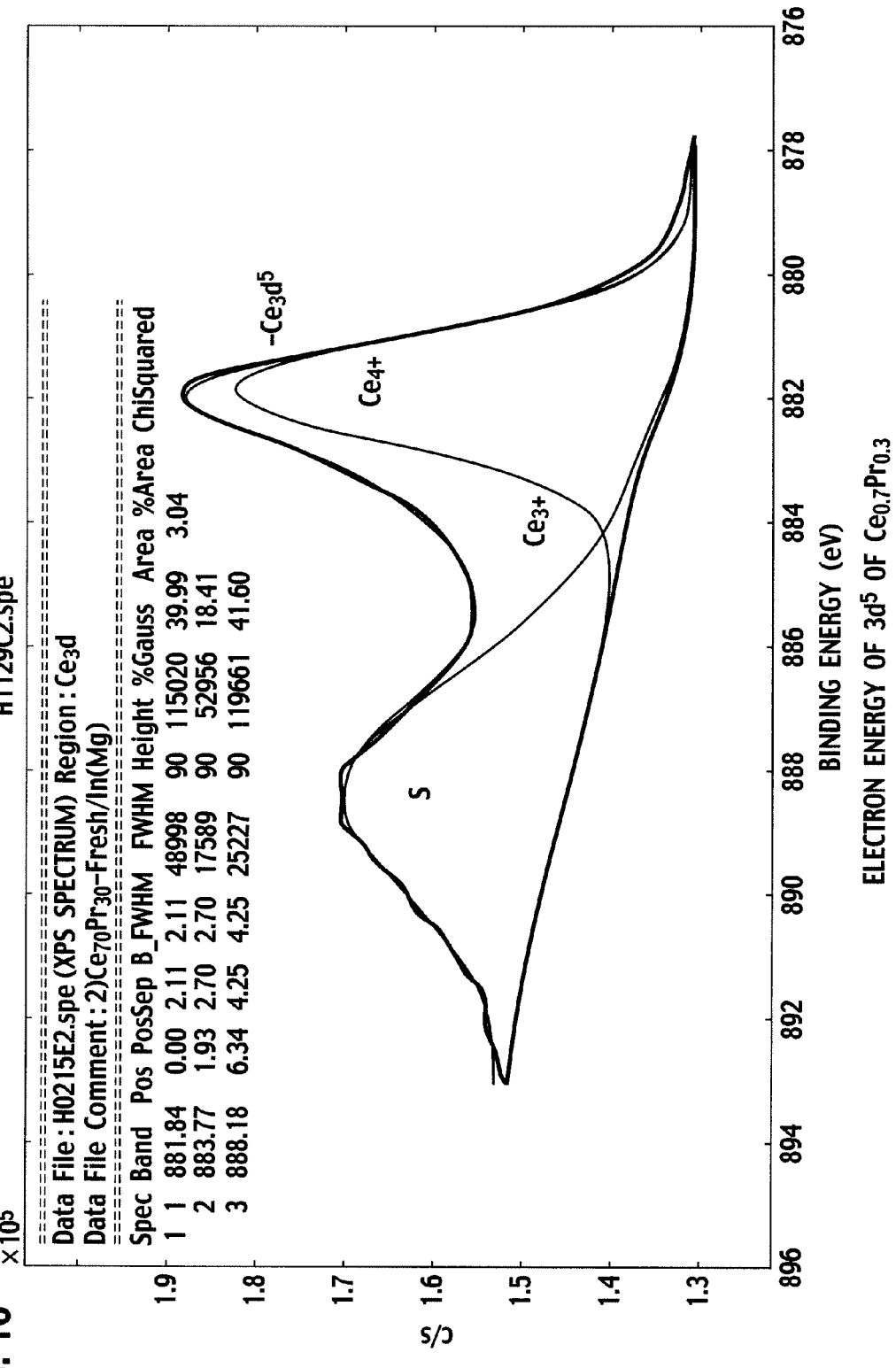
FIG. 10 is a graph showing a result of state analysis of Ce in $Ce_{0.7}Pr_{0.3}Ox$ by XPS.
Figure 11:
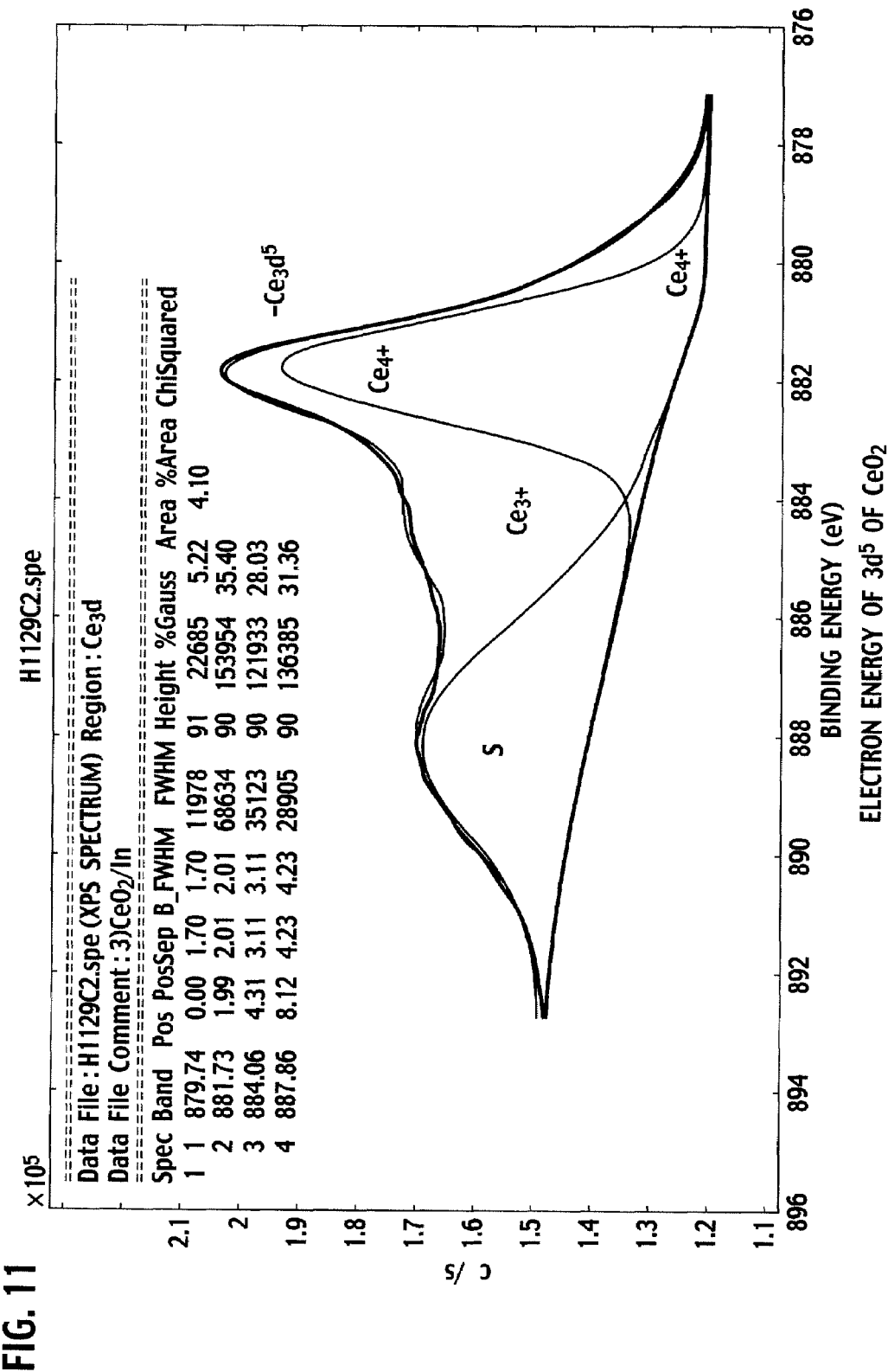
FIG. 11 is a graph showing a result of state analysis of Ce in $CeO_2$ by XPS.
Figure 12:
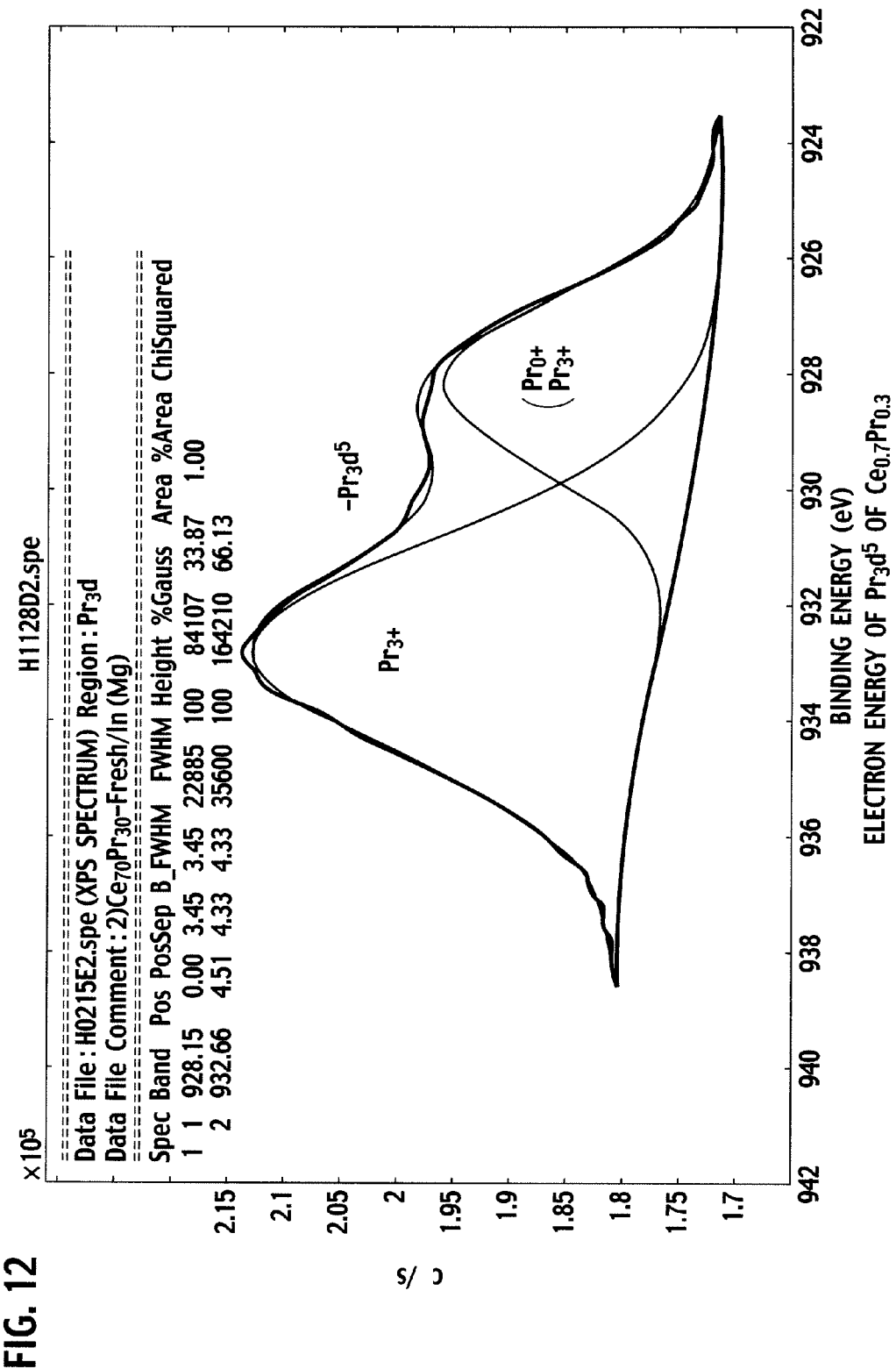
FIG. 12 is a graph showing a result of state analysis of Pr in $Ce_{0.7}Pr_{0.3}Ox$ by XPS.
Figure 13:
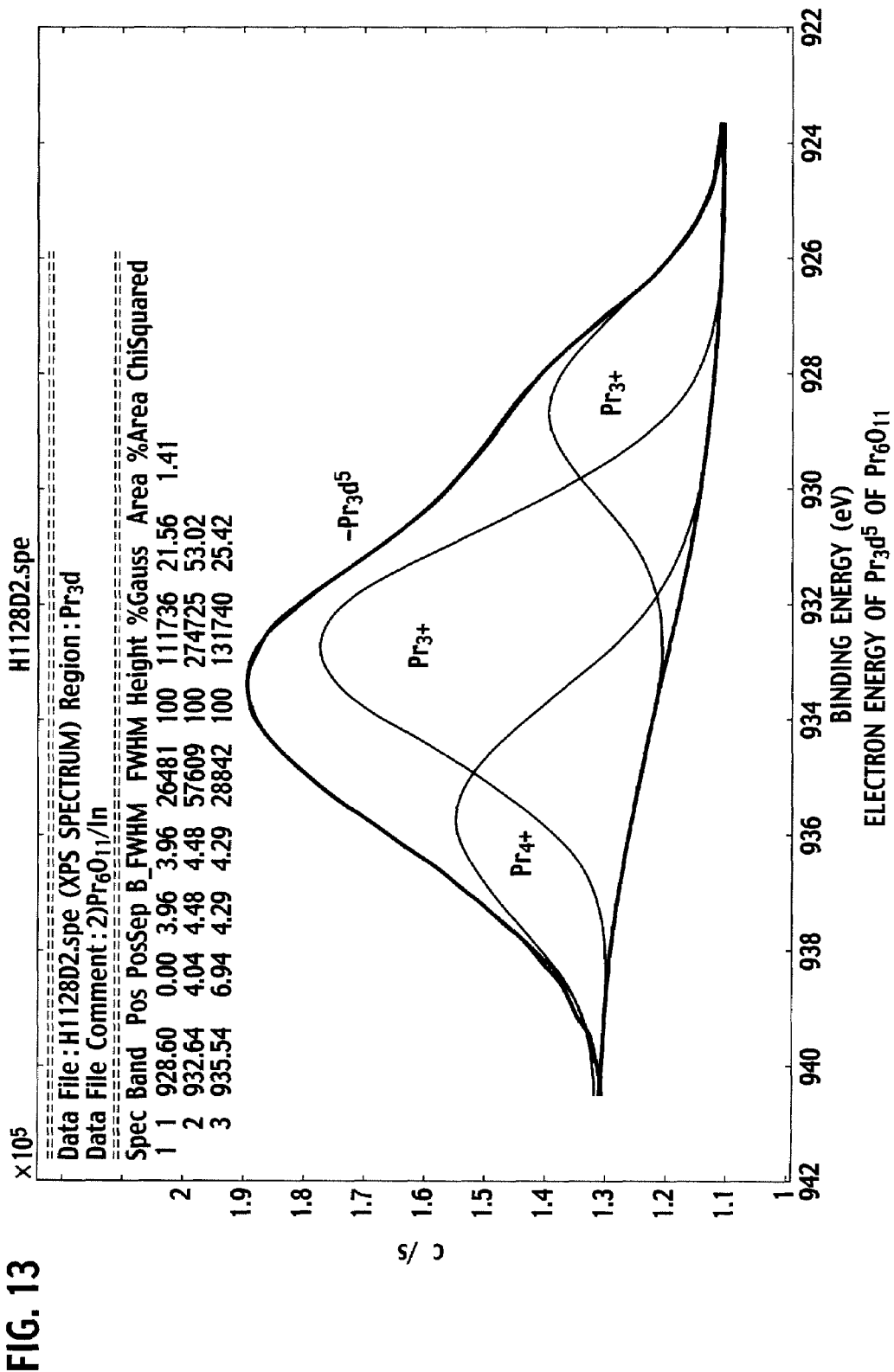
FIG. 13 is a graph showing a result of state analysis of Pr in $Pr_6O_{11}$ by XPS.

FIG. 10 shows a state of Ce in $Ce_{0.7}Pr_{0.3}Ox$, while FIG. 11 shows a state of Ce in $CeO_2$ for comparison. FIG. 12 shows a state of Pr in $Ce_{0.7}Pr_{0.3}Ox$, while FIG. 13 shows a state of Pr in $Pr_6O_{11}$ for comparison.

[Preparation of $Ce_{0.7}Pr_{0.3}Ox$+PM]

$Ce_{0.7}Pr_{0.3}Ox$ made by Anan Kasei was fired in a muffle furnace at 800° C. for 4 hrs. Then, the thus fired powder and a PM were taken (scaled) 1:1 by weight, followed by mixing for 20 min using an agate mortar.

[Preparation of $Ce_{0.7}Mn_{0.3}Ox$+PM and $Ce_{0.7}Pr_{0.3}Ox$+PM]

Figure 14:
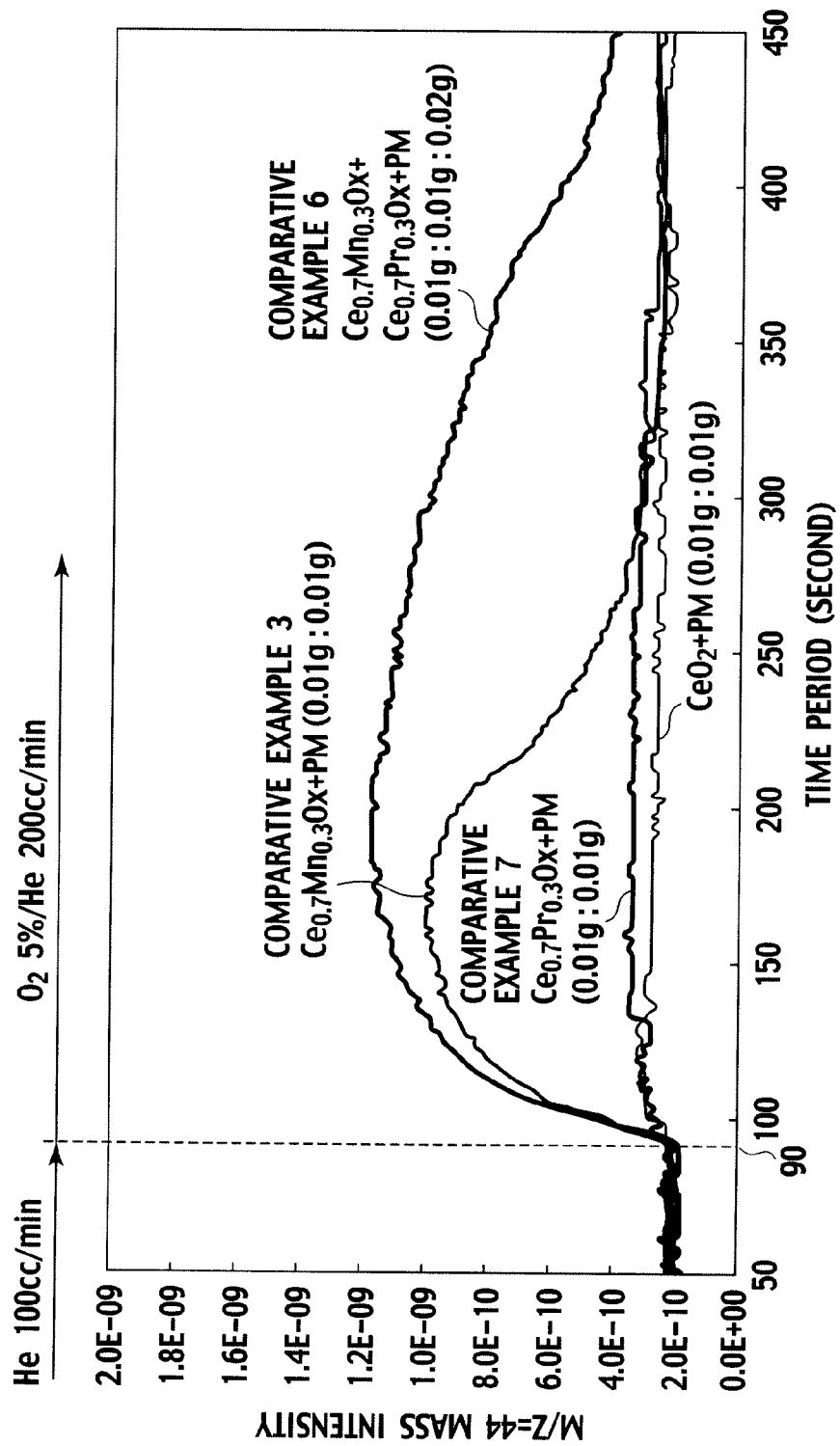
FIG. 14 is a graph showing a result of PM oxidization test by Q-MASS at 400° C.

The two mixtures obtained by the above operations were respectively taken (scaled) 1:1 by weight, followed by mixing for 20 min by using an agate mortar, to thereby prepare samples for the PM oxidization test The thus obtained samples were subjected to the PM oxidization tests set forth above, and the thus obtained results are shown in FIG. 14 and table 2. Herein, the used sample was 0.04 g and $O_2$ 5 vol % of balance gas was added at 200 cc/min.

Comparative Example 2

0.02 g of $Ce_{0.7}Pr_{0.3}Ox$+PM of the example 5 was used, and the above PM oxidization test was likewise implemented. The thus obtained results are shown in FIG. 14 and table 2.

TABLE 2

| | Composition | Quantity of PM oxidizing catalyst | Quantity of PM | Result of oxidizing PM at 400° C. Ion intensity of M/Z = 44 at time point 360 sec after oxygen introduction |
|---|---|---|---|---|
| Example 5 | Ce 70 mol %-Mn 30 mol %/Ce 70 mol %-Pr 30 mol % | 0.01 g/0.01 g | 0.01 g/0.01 g | 1.73E−07 |
| Comparative example 2 | Ce 70 mol %-Pr 30 mol % | 0.01 g | 0.01 g | 2.01E−08 |

In table 2, the performance evaluation has an index of ion intensity at a time point 360 sec (450 sec in FIG. 14) after a time point of introducing oxygen (90 sec in FIG. 14). With the device and concentration used above, the ion intensity and the $CO_2$ concentration are approximately linear, determining that a substantially proper $CO_2$ generating concentration is obtained.

Moreover, $Ce_{0.7}Mn_{0.3}Ox$ and $Ce_{0.7}Pr_{0.3}Ox$ are mixed as shown in FIG. 14 and table 2, bringing about an effect greater than that which may be brought about by adding respective effects when $Ce_{0.7}Mn_{0.3}Ox$ and $Ce_{0.7}Pr_{0.3}Ox$ are not mixed. This proves that the PM oxidization capability at a low temperature is further improved.

Calculation has found out that CeMnOx is likely to generate an oxygen defect when CeMnOx is greater than $CeO_2$ in energy difference ΔE (between when the oxygen defect is present on the surface of the oxide and when not present).

Though an ordinary Mn is trivalent in $Mn_2O_3$, the XPS result shows that the surface of the oxide is MnO, i.e., Mn is divalent. This signifies an oxygen shortage, that is, an oxygen defect. The above oxygen defect allows an oxygen movement which is necessary for oxidizing the PM.

Moreover, it is presumed that mixing CeMnOx with CePrOx improves PM oxidization performance at 400° C. for the following reason.

CeMnOx per se has oxidization capability at 400° C., though not accomplishing a 100% oxidization. With this, it is not likely that doubling the used PM quantity increases the effect of CeMnOx. Meanwhile, CePrOx has an insufficient oxidization capability at 400° C. while showing an excellent oxidization capability at 450° C.

As such, CeMnOx serves as an ignition catalyst for the PM oxidization of CePrOx. This increases temperature of CeMnOx and the CePrOx oxidization is added, thereby improving the oxidization performance. The above description is, however, merely an assumption.

Example 6

Cerium carbonate was used for obtaining 77% of $CeO_2$, and manganese carbonate was used for obtaining 8% of $Ga_2O_3$ and 15% of $MnO_4$. Then, the thus obtained was precipitated in an ammonia solution, followed by firing at 600° C., to thereby obtain CeGaMn compound oxide. The above composition includes 77% of $CeO_2$, 8% of $Ga_2O_3$ and 15% of $MnO_4$.

The CeGaMn compound oxide obtained above and the CePr compound oxide in the example 1 were used in such a manner as to vary mixing ratios (by mass), to thereby produce various PM oxidizing catalysts.

Figure 15:
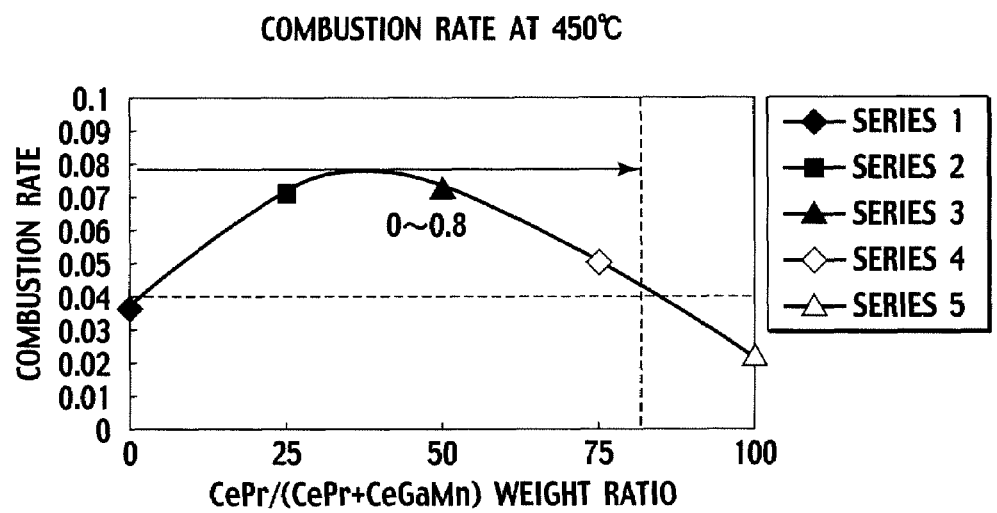
FIG. 15 is a graph showing a result of PM oxidization test by Q-MASS.

As set forth above, the thus obtained PM oxidizing catalysts were subjected to PM oxidation rate measurements at 450° C., with 0.01 g of PM quantity and 0.01 g of PM oxidizing catalyst quantity. FIG. 15 shows the thus obtained results.

As shown in FIG. 15, mixing the CeGaMn compound oxide with the CePr compound oxide at a mixing ratio of CePr/(CeGaMn+CePr)=0.1 to 0.8 (mass ratio) brings about an excellent PM oxidization effect.

Example 7

The CeGaMn compound oxide obtained by the example 6 and the CePr compound oxide obtained by the example 1 are mixed such that CeGaMn:CePr are 0.01 g:0 g, 0.075 g:0.025 g, 0.05 g:0.05 g, 0.025 g:0.075 g, and 0 g:0.01 g. 0.01 g of PM was added to each of the thus obtained mixtures, and the above PM oxidization test was implemented.

Figure 16:
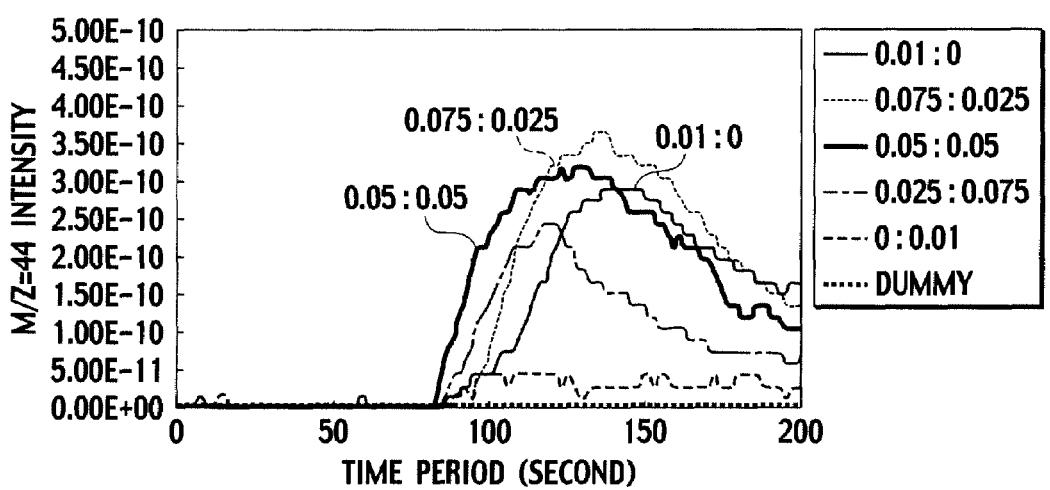
FIG. 16 is a graph showing a result of PM oxidization test by Q-MASS.
Figure 17:
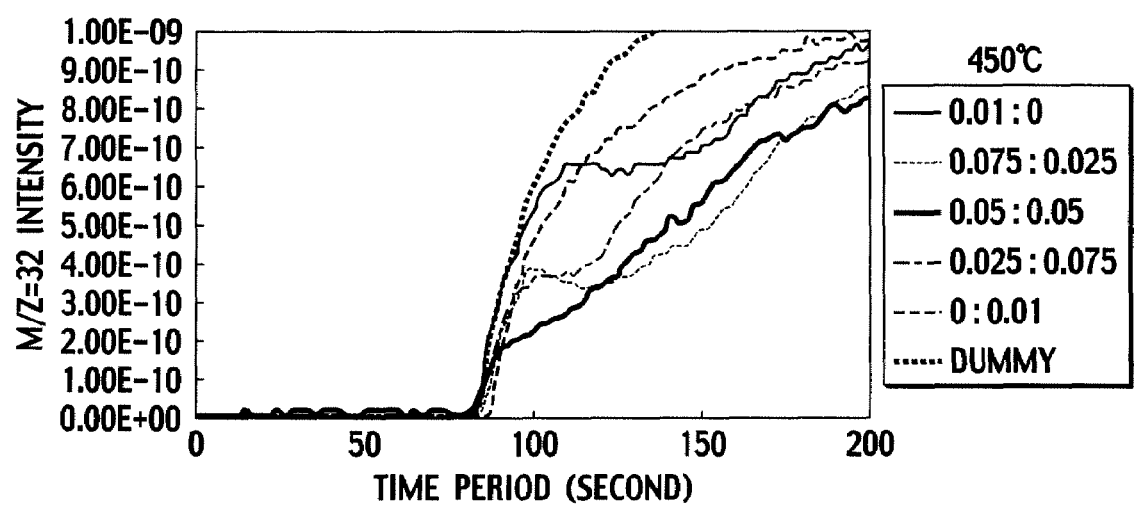
FIG. 17 is a graph showing a result of PM oxidization test by Q-MASS.

FIG. 16 and FIG. 17 show results of the PM oxidization test FIG. 16 shows detected $CO_2$, while FIG. 17 shows detected $O_2$. Besides, the language denoted by "dummy" in FIG. 16 and FIG. 17 denotes an inlet concentration of only PM.

In FIG. 16 and FIG. 17, when the oxygen consumption is present, $CO_2$ and $O_2$ are detected lower relative to the inlet concentration. The above difference is oxygen consumption quantity.

With both the $CO_2$ generation quantity and the oxygen consumption quantity observed, the results in FIG. 16 and FIG. 17 verify whether the oxidization is sequentially implemented.

CeGaMn:CePr of 0.05 g:0.05 g starts the oxygen consumption most rapidly after a distribution gas is switched to oxygen. The above means that the $CO_2$ is generated not only by the oxygen held by catalyst, but also by using a gas-phase oxygen.

That is, the gas-phase oxygen and the PM do not make a direct reaction at a test temperature 450° C. (more than or equal to 600° C. required), therefore the above phenomenon can determine that the catalyst takes in the gas-phase oxygen and is activated, accomplishing a reaction between the PM and the oxygen, thus implementing a catalyzing cycle.

Herein, the order for staring the oxygen consumption is 0.05 g:0.05 g, followed by 0.075 g:0.025 g or 0.025 g:0.075 g.

The above order is consistent with the order of the $CO_2$ generation rate. This means that the capability of generating $CO_2$ by consuming oxygen varies with mixing degree.

Although the present invention has been described above by reference to certain embodiments, the present invention is not limited to the embodiments described above. Modifications and variations of the embodiments described above will occur to those skilled in the art, in light of the above teachings.

This application is based on prior Japanese Patent Application Nos. P2006-302632 (filed on Nov. 8, 2006 in Japan) and P2007-179880 (filed on Jul. 9, 2007 in Japan). The entire contents of the Japanese Patent Application Nos. P2006-302632 and P2007-179880 from which priorities are claimed are incorporated herein by reference, in order to take some protection against translation errors or omitted portions.

The scope of the present invention is defined with reference to the following claims.

What is claimed is:

1. A particulate matter oxidizing catalyst comprising:
   gallium;
   at least one metal selected from the group consisting of:
   manganese, iron, cobalt, nickel, copper, yttrium, zirconium, niobium, molybdenum, silver, lanthanum, praseodymium, neodymium and gold; and cerium,
   wherein a first oxide includes:
      cerium, and
      a first metal which is at least one element selected from the group consisting of:
      gallium, manganese, iron, cobalt and nickel,
   wherein a second oxide includes:
      cerium, and
      a second metal consisting of
      praseodymium, and
   wherein the second oxide and the first oxide have a content ratio of second oxide/(first oxide+second oxide)=0.1 by mass to 0.8 by mass and
   wherein cerium and praseodymium which are included in the second oxide have a mole ratio of cerium:praseodymium=4:1 to 1:4.

2. The particulate matter oxidizing catalyst according to claim 1, further comprising:
   a noble metal which is at least one element selected from the group consisting of platinum, palladium, rhodium and iridium.

3. The particulate matter oxidizing catalyst according to claim 1, wherein a lattice oxygen desorption energy difference by a density functional theory is defined between when an oxygen defect is present on a surface of each of the first oxide and the second oxide and when the oxygen defect is not present, and
   wherein the lattice oxygen desorption energy difference of each of the first oxide and the second oxide is less than or equal to 60 kcal/mol.

4. The particulate matter oxidizing catalyst according to claim 1, wherein a first layer including the first oxide is formed at a particulate filter, and
   a second layer including the second oxide is formed at the particulate filter in such a configuration as to be separated from the first layer.

5. The particulate matter oxidizing catalyst according to claim 4, wherein the first layer is formed upstream relative to an exhaust gas flow, and the second layer is formed downstream relative to the exhaust gas flow.

6. The particulate matter oxidizing catalyst according to claim 4, wherein the second layer is formed lower relative to the first layer and the first layer is formed above the second layer.

7. A particulate matter oxidizing catalyst comprising:
a first oxide comprising:
   cerium, and
   a first metal consisting of gallium, and
a second oxide comprising:
   cerium, and
   a second metal consisting of:
      praseodymium,
wherein the second oxide and the first oxide have a content ratio of second oxide/(first oxide+second oxide)=0.1 by mass to 0.8 by mass and
wherein cerium and praseodymium which are included in the second oxide have a mole ratio of cerium:praseodymium=4:1 to 1:4.

8. A particulate matter oxidizing catalyst comprising:
a first oxide comprising: cerium; and a first metal which is at least one element selected from the group consisting of: gallium, manganese, iron, cobalt and nickel, and
a second oxide comprising: cerium, and a second metal consisting of: praseodymium,
wherein the second oxide and the first oxide have a content ratio of second oxide/(first oxide+second oxide)=0.1 by mass to 0.8 by mass, and
wherein cerium and praseodymium which are included in the second oxide have a mole ratio of cerium:praseodymium=4:1 to 1:4.

* * * * *